United States Patent
Makinson et al.

(10) Patent No.: US 7,023,861 B2
(45) Date of Patent: Apr. 4, 2006

(54) MALWARE SCANNING USING A NETWORK BRIDGE

(75) Inventors: Graham Arthur Makinson, Tingewick (GB); Eamonn John Baulk, Rickmansworth (GB); Daniel Joseph Wolff, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 740 days.

(21) Appl. No.: 09/912,305

(22) Filed: Jul. 26, 2001

(65) Prior Publication Data

US 2003/0021280 A1    Jan. 30, 2003

(51) Int. Cl.
*H04L 9/32* (2006.01)
*H04L 12/66* (2006.01)
*H04L 29/06* (2006.01)
*G06F 11/30* (2006.01)

(52) U.S. Cl. ............... 370/401; 370/466; 370/469; 707/10; 709/224; 713/152; 713/153; 713/188; 726/22

(58) Field of Classification Search ............. 370/389, 370/392, 401, 402, 469, 474, 466; 709/221, 709/229, 238, 320, 224; 713/201, 188, 152, 713/153; 707/10; 726/22
See application file for complete search history.

(56) References Cited

U.S. PATENT DOCUMENTS

| | | | | |
|---|---|---|---|---|
| 5,414,833 A | * | 5/1995 | Hershey et al. | 713/201 |
| 5,606,668 A | * | 2/1997 | Shwed | 713/201 |
| 5,623,600 A | * | 4/1997 | Ji et al. | 713/201 |
| 5,796,942 A | * | 8/1998 | Esbensen | 713/201 |
| 5,828,846 A | * | 10/1998 | Kirby et al. | 709/238 |
| 5,889,943 A | | 3/1999 | Ji et al. | |
| 6,212,558 B1 | * | 4/2001 | Antur et al. | 709/221 |
| 6,233,618 B1 | * | 5/2001 | Shannon | 709/229 |
| 6,321,267 B1 | * | 11/2001 | Donaldson | 713/201 |
| 6,356,554 B1 | * | 3/2002 | Pickett et al. | 370/402 |
| 6,553,377 B1 | * | 4/2003 | Eschelbeck et al. | 707/10 |
| 6,553,378 B1 | * | 4/2003 | Eschelbeck | 707/10 |
| 6,567,808 B1 | * | 5/2003 | Eschelbeck et al. | 707/10 |
| 6,745,192 B1 | * | 6/2004 | Libenzi | 707/100 |

(Continued)

FOREIGN PATENT DOCUMENTS

EP    0 909 073    4/1999

OTHER PUBLICATIONS

"New Lucent Security Management Server V4.0 Raises Bar on Scalability for Large Corporate and Service Provider Networks" Lucent Technologies Press Release, Internet, Jun. 1999.

(Continued)

*Primary Examiner*—Alpus H. Hsu
(74) *Attorney, Agent, or Firm*—Zilka-Kotab, PC; Christopher J. Hamaty

(57) ABSTRACT

A network bridge (14) has an associated malware scanner (16) that serves to concatenate portions of a data file from within data packets intercepted by the network bridge (14) and then scan the data file concerned before the data file is forwarded to its intended recipient by the network bridge (14). The network bridge (14) may be inserted in a network topology without requiring significant network configuration changes. The network bridge (14) may include a packet analysis unit (56) that serves to intercept only data packets having a predetermined network layer protocol or a predetermined application layer protocol.

14 Claims, 5 Drawing Sheets

U.S. PATENT DOCUMENTS

| | | |
|---|---|---|
| 6,748,534 B1 * | 6/2004 | Gryaznov et al. ........... 713/188 |
| 6,772,345 B1 * | 8/2004 | Shetty ........................ 726/24 |
| 6,804,778 B1 * | 10/2004 | Levi et al. ................... 713/201 |
| 6,973,577 B1 * | 12/2005 | Kouznetsov ................... 707/9 |
| 2004/0039942 A1 * | 2/2004 | Cooper et al. .............. 713/201 |

OTHER PUBLICATIONS

T. Limoncelli, "Tricks You Can Do If Your Firewall is a Bridge" First Conference on Network Administration (NETA'99) Proceedings USENIX Assoc., Jun. 1999, pp. 47-55.

* cited by examiner

MALWARE SCANNING USING A NETWORK BRIDGE

BACKGROUND OF THE INVENTION

1. Field of the Invention

This invention relates to the field of data processing systems. More particularly, this invention relates to the field of malware scanning, such as computer virus scanning or e-mail content scanning, as applied in network environments.

2. Description of the Prior Art

Networked computer systems are becoming increasingly common and complex. A large organisation will typically have a considerable investment in terms of time and effort in its network topology design and configuration. A large network may typically contain one or more gateways, routers and bridges operating in conjunction with one or more network segments. Once the topology of such a network has been established, changes in the topology, such as segment division and address changes, are time consuming and expensive to implement.

As computer systems and computer networks become increasingly important to their users, the threat posed by malware, such as computer viruses, Trojans, worms, banned computer programs or abusive e-mails, becomes increasingly significant. Malware scanners are an important form of defence against such problems.

FIG. 1 of the accompanying drawings schematically illustrates a simple network in the form of a server 2, a plurality of client computers 4, 6, 8 and a gateway 10 all connected upon a single network segment using the IP addresses 192.168.1.x. The gateway computer 10 separates this segment from the outside world and performs any necessary IP address translation as required.

FIG. 2 of the accompanying drawings illustrates how the system of FIG. 1 may be modified to include a malware scanner 12. The malware scanner 12 is physically interposed between the gateway computer 10 and the rest of the network. This divides the original single segment into two portions requiring a change in the network topology downstream of the gateway computer 10. The malware scanner 12 requires programming with appropriate IP addresses at each of its interfaces and the gateway computer 10 requires programming with a new IP address to reflect its new segment. Further changes may also be required in the client computers 4, 6, 8. Whilst the malware scanner 12 may provide effective malware defence, it brings with it a disadvantageous need to reconfigure the network which it is protecting. Often specialist knowledge is required to make such reconfiguration changes and in a more sophisticated and complex network environment the difficulties can be considerable.

Another way in which a malware scanner may be added (although this is not illustrated) may be such that it is not physically interposed in the path of the network traffic, but instead forms a node on the segment which it protects. Whilst this may avoid the need for changes in the segment topology, there will typically be required significant other changes elsewhere in the system in order to ensure that network traffic is routed via the malware scanner that has been introduced. Thus, such alternative arrangements also carry with them similar significant disadvantages as those discussed in relation to FIG. 2.

It is known to provide network analysis tools that may be attached to a network to monitor the network traffic thereupon. Such network analysis tools are often used to help in diagnosing network problems. Typical functions provided by such network analysis tools are to record all the traffic on a network, identify the network addresses exchanging data packets and statistically analyse the data flow. If required, a detailed analysis of the particular messages being exchanged by one or more nodes within the network may also be monitored.

The components that are often used to provide network infrastructure include gateways, routers, switches and bridges. Network bridges can be used to effectively isolate different portions of a network segment to reduce the occurrence of data collisions upon the network segments. As network bandwidths have increased and the use of switches has become more common, the need for network bridges has reduced.

SUMMARY OF THE INVENTION

Viewed from one aspect the present invention provides a network bridge having a malware scanner.

The invention recognises that a network bridge, which may be inserted within a segment without requiring further changes within that segment, provides a mechanism by which access may be gained to the network traffic on that segment in order to allow malware scanning to be performed. In order not to significantly constrain the network performance of the system in which they are introduced it is the normal design practice for network bridges that they should be made as simple and as fast as possible. The invention moves against this trend by recognising that in many circumstances in which malware scanning is required the absolute level of network performance is far less critical than might normally be considered. Furthermore, the increase in the data processing capabilities of data processing hardware is such that significant amounts of malware scanning can be performed within a network bridge without unduly impacting the overall system performance. In many cases the malware scanning needs to be performed at some point along the path between the source and destination and having this scanning take place within a network bridge does not introduce any more of a delay than having the scanning performed at another point, such as by the recipient.

In preferred embodiments of the invention a data packet analyser is provided to selectively identify those data packets that are to be subject to scanning.

This preferred feature of the invention recognises that not all data packets are capable of or require scanning and accordingly such packets are advantageously not delayed by being passed to the malware scanner.

The data packet analyser can be responsive to different properties of the data packets to determine whether or not they are to be passed to the malware scanner, but in preferred embodiments the data packet analyser identifies the network layer protocol and/or the application layer protocol associated with a data packet as part of determining whether or not it should be passed to the malware scanner for scanning.

Whilst some types of malware scanning may be performed upon a part of a file, such as the identification of simple computer viruses, in preferred embodiments of the invention the malware scanner serves to concatenate a complete data file prior to scanning it for one or more of computer viruses, Trojans, worms, banned computer programs and banned words within e-mail messages.

Whilst it would be possible for the bridge to buffer and re-transmit the data packets substantially unaltered once they had passed malware scanning, preferred embodiments are such that the malware scanner serves to forward a data file after scanning, and possible alteration via repair, to its intended recipient. This simplifies the load on the bridge and allows greater flexibility since the bridge does not try to reproduce exactly the same data packets.

It will be appreciated that the malware scanner could take a wide variety of forms. In particular both software based malware scanners and hardware based malware scanners are possible. More than one malware scanner may be associated with a particular network bridge, each of these malware scanners being responsible for scanning for a different type of malware, such as a software based e-mail scanner and a hardware based http scanner.

Viewed from other aspects the invention also provides a network bridge adapted for co-operation with a separate malware scanner than may be provided as a distinct entity. Similarly, another aspect of the invention may be considered to be a malware scanner adapted to cooperate with a network bridge. A further aspect of the invention is a method of malware scanning in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
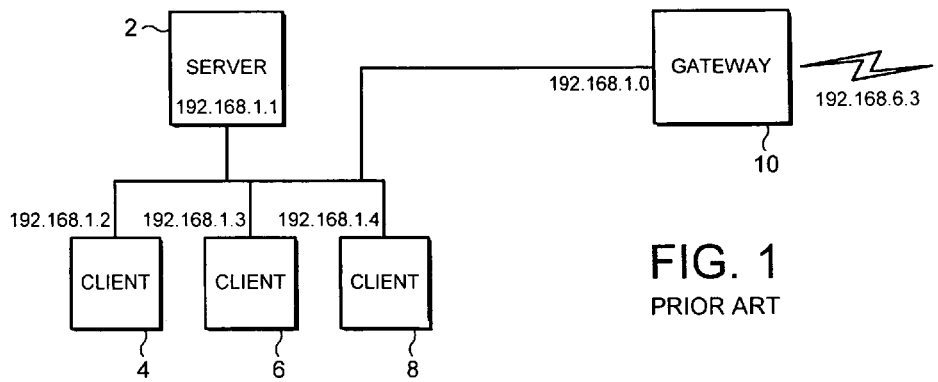
FIG. 1 schematically illustrates a simple network topology.
Figure 2:
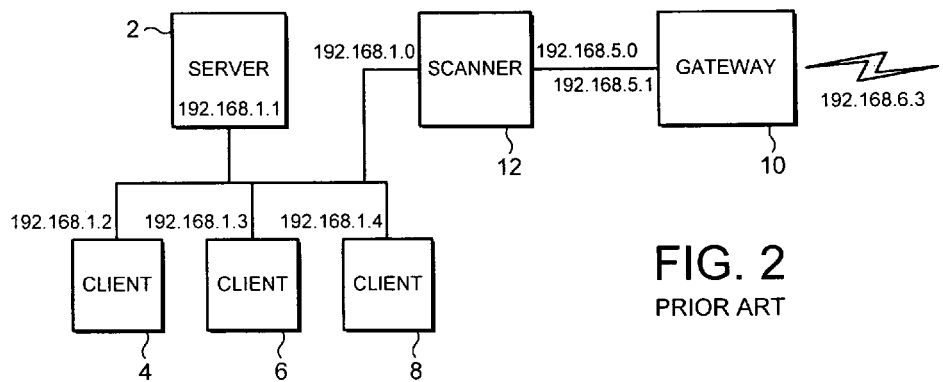
FIG. 2 schematically illustrates a network of FIG. 1 incorporating a malware scanner.
Figure 3:
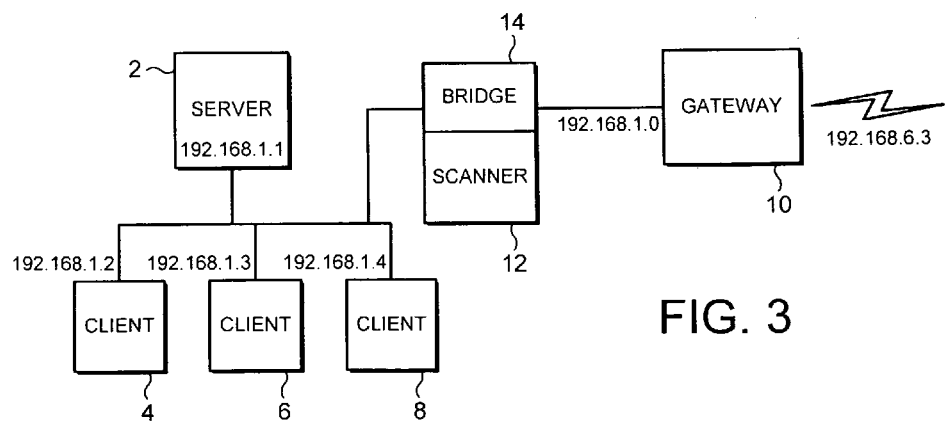
FIGS. 3, 4 and 5 schematically illustrate different network topologies incorporating a network bridge with an associated malware scanner.

FIG. 3 schematically illustrates the network of FIG. 1 but in this case incorporating a network bridge 14 between the gateway computer 10 and the rest of the network segment. As such as a network bridge is effectively transparent to the data packets passing through it, at least in terms of their addressing, no configuration changes are required in the network segment illustrated in FIG. 3 upon introduction of the network bridge 14. A malware scanner 16 is associated with (e.g. incorporated within or coupled to) the network bridge 14 and serves to concatenate data files to scan at least some of the data packets passing through the network bridge 14. The arrangement illustrated in FIG. 3 would be appropriate to provide a malware scanner for SMTP data file types received by the gateway 10 and being sent to a mail server. Such SMTP data files are typically non-time critical and so a delay that might be introduced by the redirection of these data packets by the bridge 14 to the malware scanner 16 is relatively insignificant.

Figure 4:
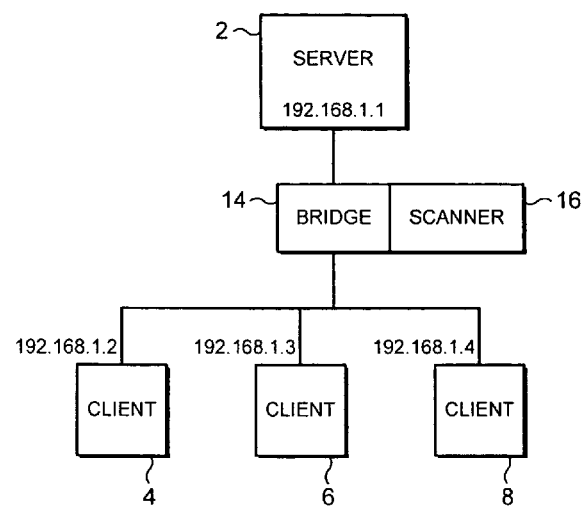

FIG. 4 schematically illustrates a different arrangement in which the network bridge 14 and malware scanner 16 are disposed between a server 2 and the client computers 4, 6, 8. Again no changes are required to the network topology, and in particular no address changes are necessary as the network bridge 14 is address transparent. The arrangement illustrated in FIG. 4 might be appropriate to provide anti-computer virus scanning of data file stored upon the server 2. The malware scanner 16 would typically need to be of a higher performance than that illustrated in FIG. 3 as delays in file access to data files stored on the server 2 would be likely to be more noticeable to a user.

Figure 5:
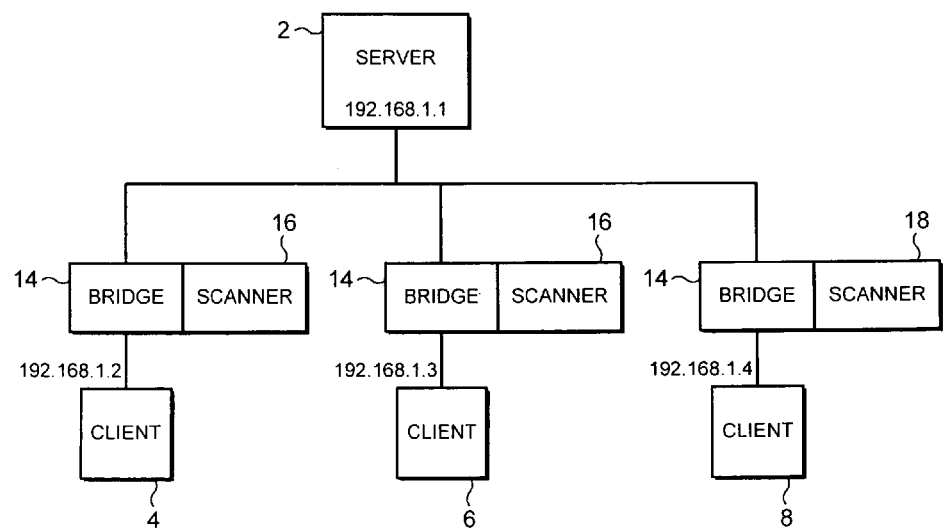

FIG. 5 illustrates another example network topology. In this example a network bridge 14 and associated malware scanner 16 is provided for each of the client computers 4, 6, 8 and serves to provide malware scanning for all data packets going to and from their particular associated client computer 4, 6, 8. A high performance malware scanner 16 would again be required for such an arrangement in order to not significantly degrade the performance of the system. The address transparent network bridges 14 mean that no address configuration changes are required when the network bridges 14 and their associated malware scanners 16 are introduced.

It will be appreciated that the malware scanners 16 illustrated in relation to FIGS. 3, 4 and 5 could be arranged to provide malware protection against one or more different types of malware. At a simple level, SMTP file scanning for banned words could be performed. Moving on from this, FTP scanning might be provided for files downloaded from the internet as these are a high risk for virus infection. Moving on still further, anti-virus scanning could be provided for the network internal file access protocols, such as NFS, that may be used within the local network itself to access files on the file server 2.

Figure 6:
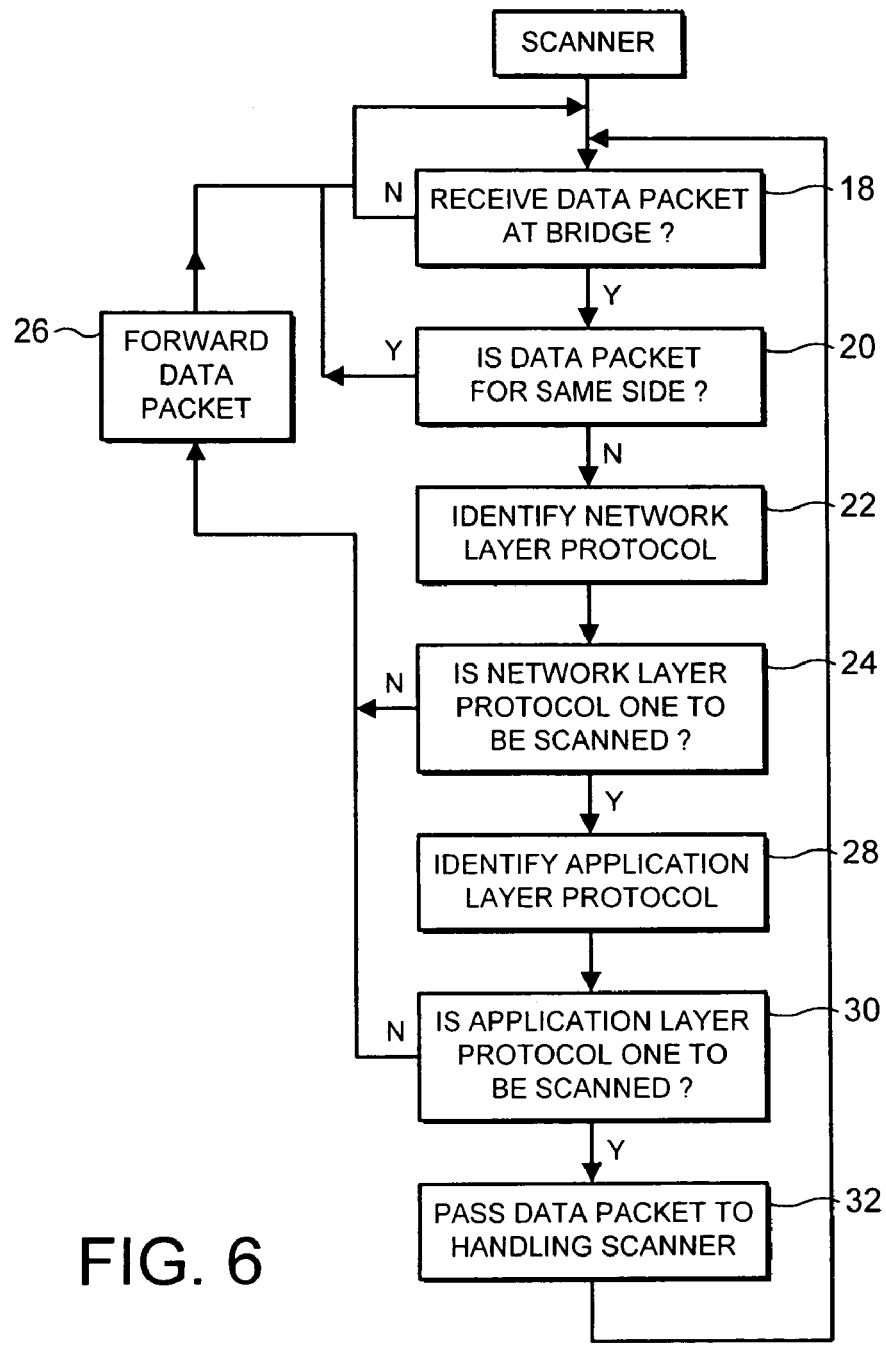
FIG. 6 is a flow diagram schematically illustrating the processing flow performed by a network bridge.

FIG. 6 is a flow diagram schematically illustrating the processing performed by the network bridge 14. At step 18 the network bridge 14 waits until it receives a data packet. At step 20 the network bridge 14 checks to see if the data packet is one that is to pass through the network bridge 14 or is alternatively intended for a recipient on the same side of the network bridge 14 as the packet was received. If the data packet is not to pass through the network bridge 14, then processing is returned to step 18 to await receipt of the next data packet. If the data packet is to pass through the network bridge 14, then step 22 serves to identify the network layer protocol associated with that data packet. At step 24 this network layer protocol is checked to see if it is one which is to be scanned by the associated malware scanner 16. It may well be that the malware scanner 16 is only able to deal with network layer protocols of particular types, such as, but not limited to TCP/IP, IPX, SNA or Appletalk with other network layer protocols being forwarded without scanning via step 26.

If step 24 indicateds that the data packet had a network layer protocol of a type suitable for scanning, then step 28 serves to identify the application layer protocol associated with that data packet. Again only certain types of application layer protocol (such as, for example, SMTP, FTP, HTTP, SMB or NFS) may be intended for scanning by the associated malware scanner 16 and these are selected for scanning by step 30. If the identified application layer protocol is not one that is to be scanned, then the data packet is again forwarded to its intended recipient via step 26. If the data packet has both a network layer protocol and an application layer protocol matching those that are to be scanned, then processing will proceed to step 32 at which the data packet is passed to the malware scanner 16 in order to be concatenated to form a data file to be scanned. Processing then returns to step 18 to await the next data packet.

Figure 7:
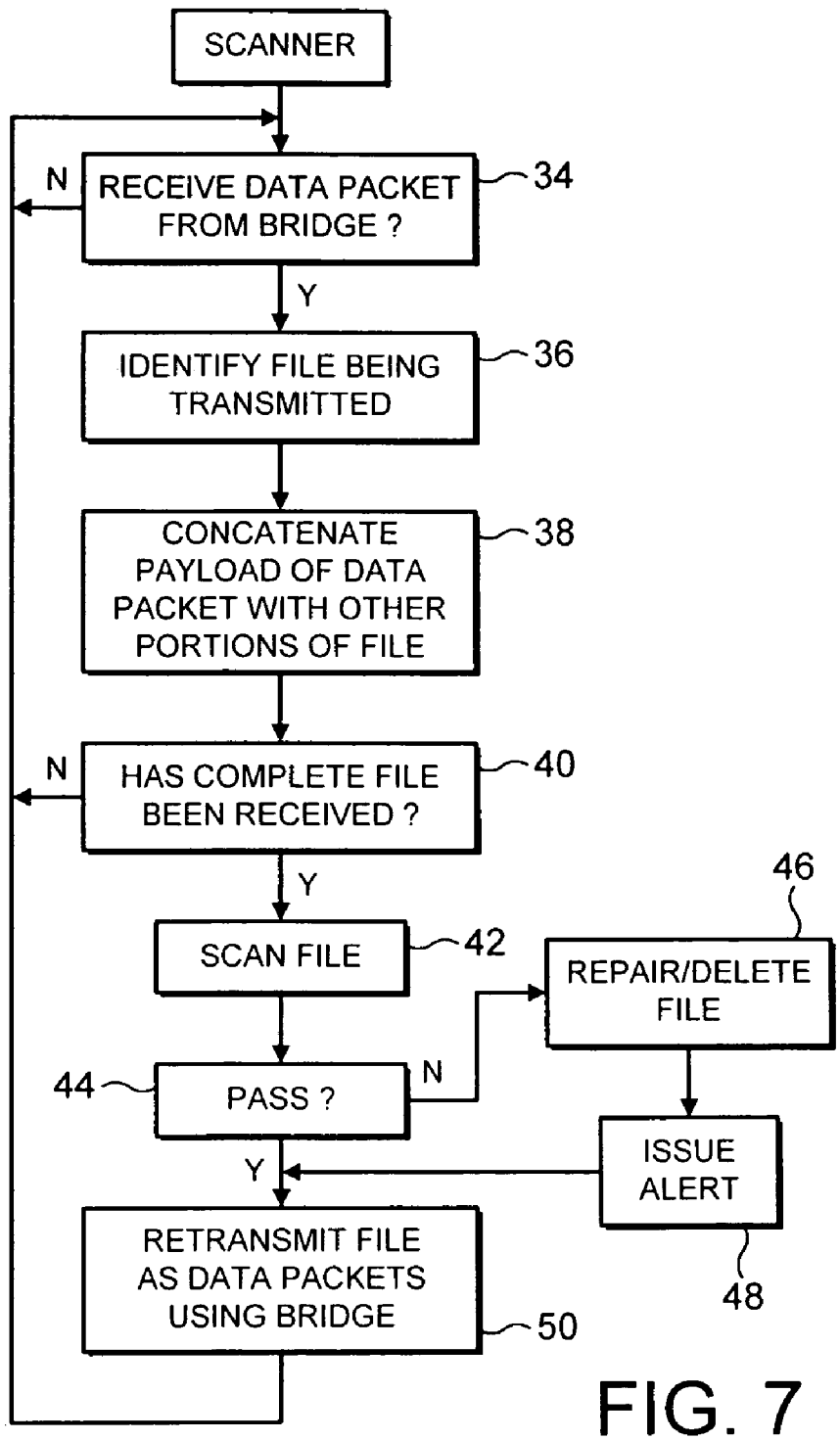
FIG. 7 is a flow diagram schematically illustrating the processing flow performed by a malware scanner.

FIG. 7 schematically illustrates the processing flow within the malware scanner 16. At step 34 the malware scanner waits to receive data packets from the network bridge 14 as passed to it via step 32 of FIG. 6. When a data packet is received, step 36 serves to identify the file being transmitted in the data payload of that data packet. It may well be that the data packets passing across the network mix together a plurality of different data files and accordingly the malware scanner needs to separate out the data payloads for these different data files in order that they can be properly concatenated to their respective data files. Step 38 performs the concatenation of the data payload of the data packet into its respective data file.

At step 40 a determination is made as to whether or not a complete data file has been received by the receipt of the latest data packet. If a complete data file has not yet been received, then processing returns to step 34 to await the next data packet. In preferred embodiments, additional processing may be performed in step 40 to provide mechanisms for dealing with incorrect operation, such as excessively delayed files being dealt with through timeouts, or file corruption, that might otherwise prevent the system operating properly.

If the test at step 40 indicated that a complete file has been received, then step 42 serves to apply the appropriate form of malware scanning using known malware scanning techniques, such as computer virus scanning (for viruses, Trojans, worms or banned files), e-mail scanning and the like. At step 44 a test is made as to whether or not the computer file has passed its scan. If the computer file has not passed its scan, then step 46 serves to repair or delete the file (as may be set by user configuration) and then issue an alert (such as sending an e-mail to a user configured address) at step 48. After step 48, or if the computer filed passed it scan as indicated at step 44, then step 50 serves to send the data file that has been scanned back to the network bridge 14 for it to be retransmitted to its intended recipient by the network bridge 14.

Figure 8:
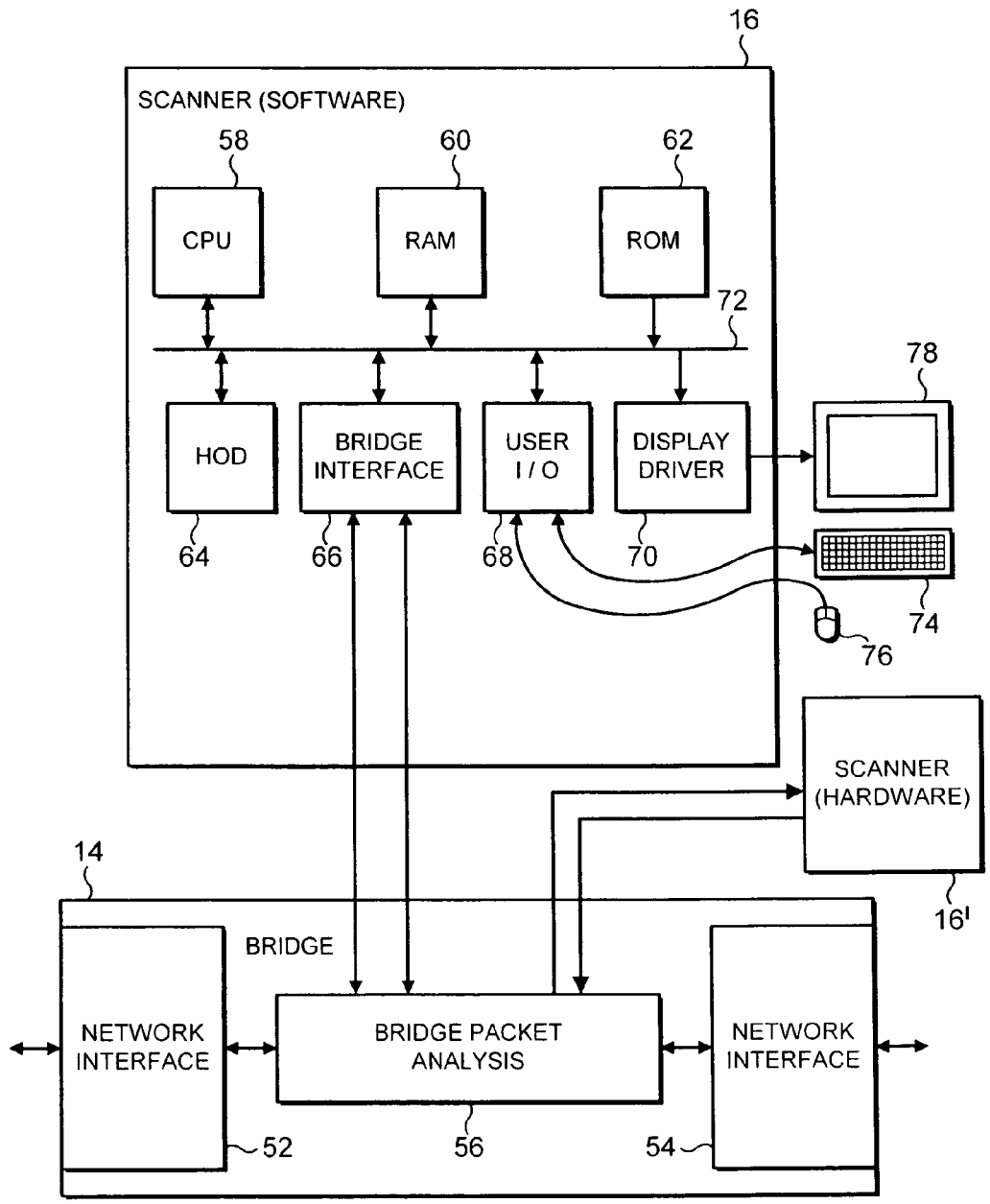
FIG. 8 schematically illustrates a network bridge and malware scanner configuration.

FIG. 8 schematically illustrates the network bridge 14 and the malware scanner 16 in more detail. The network bridge 14 includes respective network interface units 52, 54 at its two connection points to the network in which it is inserted. These network interface units 52, 54 operate to receive all data packets on their associated network line and pass these packets to a packet analysis unit 56. This packet analysis unit 56 may be provided in the form of high speed hardware for performing the processing illustrated in FIG. 6 or software. In this example two different malware scanners 16, 16' are provided and accordingly step 32 of FIG. 6 would be modified to pass the identified data packets to the appropriate one of the malware scanners, 16, 16' that was to handle it in dependence upon the identified network layer protocol and/or application layer protocol. When the appropriate malware scanner 16, 16' has scanned, and possibly repaired, a data file, then it returns this data file to a packet analysis unit 16 where it may be again broken down into data packets for forwarding to its intended recipient via the appropriate network interface unit 52, 54.

The malware scanner 16 is illustrated in the form of a software based scanner using a general purpose computer formed of a central processing unit 58, a random access memory 60, a read only memory 62, a hard disk drive 64, a bridge interface unit 66, a user input/output unit 68 and a display driver 70 all connected via a common bus 72. This form of general purpose computer architecture is well known and operates with the central processing unit 58 executing program instructions that may be stored in one or more of the random access memory 60, the read only memory 62 or upon the hard disk drive 64. The processing performed by the central processing unit 58 may effectively carry out malware scanning by comparing a received data file against a collection of malware defining data, such as virus definition data. This virus definition data, and an associated scanner engine program, may be automatically updated from a central source, such as an anti-virus providers FTP server, with the scanner 16 making an internet connection via a detected gateway to download updated virus definition data or an updated scanner engine program. The software scanner 16 may be configured by a user providing inputs via a keyboard 74 and a mouse 76 whilst observing a generated user interface on a monitor 78. As an alternative, web based configuration of the software scanner 16 may be possible via a network connection to the software scanner 16 with the elements 68, 70, 74, 76 and 78 then being redundant. Alternative architectures of the general purpose computer are also possible.

In contrast to the highly programmable and flexible software scanner 16, a hardware based scanner 16' may also be provided. The software based scanner 16 could perform non-time critical scanning such as SMTP scanning whereas an optional high performance hardware scanner 16' could be provided, for example, to scan for computer viruses with NFS application layer protocol data packets. It may be that a wide variety of different malware scanner plug-ins could be provided tailored to particular types of malware scanning that could be performed upon the data packets intercepted by the network bridge 14. A user could then decide to adopt however many of these malware scanners as was appropriate to their requirements and budget.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A network bridge, said network bridge including a malware scanner:

wherein said network bridge is address-transparent with respect to data packets passing therethrough, such that at least in terms of addressing, no configuration changes are required when said network bridge is introduced in an associated network segment;

wherein, upon receipt of at least one of said data packets, said network bridge determines if said at least one data packet is intended for a recipient on a side of said network bridge on which said at least one data packet was received;

wherein, if it is determined that said at least one data packet is intended for a recipient on a side of said network bridge on which said at least one data packet was received, said at least one data packet is not passed by said network bridge;

wherein, if it is determined that said at least one data packet is not intended for a recipient on a side of said network bridge on which said at least one data packet was received, it is determined if said at least one data packet has a predetermined network layer protocol selected from the group consisting of TCP/IP; IPX; SNA; and Appletalk;

wherein, if it is determined that said at least one data packet has said predetermined network layer protocol, it is determined if said at least one data packet has a predetermined application layer protocol selected from the group consisting of SMTP; FTP; HTTP; SMB; and NFS;

wherein, if it is determined that said at least one data packet has said predetermined application layer protocol, portions of a data file from a plurality of said data packets are concatenated to form a data file to be scanned;

wherein, if it is determined that said at least one data packet does not have said predetermined application layer protocol, said at least one data packet is passed by said network bridge without being scanned.

2. A network bridge as claimed in claim 1, wherein said malware scanner is operable to scan for one or more of:
computer viruses;
Trojans;
worms;
banned computer programs; and
banned words within e-mail messages.

3. A network bridge as claimed in claim 1, wherein data that has been scanned by said malware scanner is forwarded to its intended recipient.

4. A network bridge as claimed in claim 1, wherein said malware scanner is formed of one or more of:
a software based malware scanner; and
a hardware based malware scanner.

5. A network bridge as claimed in claim 1, wherein said network bridge includes a pair of network interface units that operate to receive said data packets on an associated network line and pass said at least one data packet to a packet analysis unit connected thereto, said packet analysis unit coupled to a software based malware scanner and a hardware based malware scanner.

6. A network bridge as claimed in claim 1, wherein a plurality of said malware scanners is included with said network bridge, each malware scanner adapted for handling different predetermined network layer protocols and different predetermined application layer protocols, where said malware scanners are passed said at least one data packet based on said determination whether said at least one data packet has said predetermined network layer protocol and said determination whether said at least one data packet has said predetermined application layer protocol.

7. A network bridge as claimed in claim 1, wherein, after scanning, a data file is broken down into said data packets for forwarding to an intended recipient.

8. A network bridge comprising:
means for intercepting at least one data packet,
means for forwarding at least a portion of said at least one data packet to a malware scanner for scanning, and
means for forwarding data from said at least one data packet after scanning to an intended recipient;
wherein said network bridge is address-transparent with respect to data packets passing therethrough, such that at least in terms of addressing, no configuration changes are required when said network bridge is introduced in an associated network segment;
wherein, upon receipt of at least one of said data packets, said network bridge determines if said at least one data packet is intended for a recipient on a side of said network bridge on which said at least one data packet was received;
wherein, if it is determined that said at least one data packet is intended for a recipient on a side of said network bridge on which said at least one data packet was received, said at least one data packet is not passed by said network bridge;

wherein, if it is determined that said at least one data packet is not intended for a recipient on a side of said network bridge on which said at least one data packet was received, it is determined if said at least one data packet has a predetermined network layer protocol selected from the group consisting of TCP/IP; IPX; SNA; and Appletalk;

wherein, if it is determined that said at least one data packet has said predetermined network layer protocol, it is determined if said at least one data packet has a predetermined application layer protocol selected from the group consisting of SMTP; FTP; HTTP; SMB; and NFS;

wherein, if it is determined that said at least one data packet has said predetermined application layer protocol, portions of a data file from a plurality of said data packets are concatenated to form a data file to be scanned;

wherein, if it is determined that said at least one data packet does not have said predetermined application layer protocol, said at least one data packet is passed by said network bridge without being scanned.

9. A malware scanner in combination with a network bridge, comprising:
means for receiving at least a portion of at least one data packet intercepted by said network bridge,
means for concatenating said at least one data packet into a data file to be scanned, and
means for forwarding said data file after scanning to an intended recipient via said network bridge;
wherein said network bridge is address-transparent with respect to data packets passing therethrough, such that at least in terms of addressing, no configuration changes are required when said network bridge is introduced in an associated network segment;
wherein, upon receipt of at least one of said data packets, said network bridge determines if said at least one data packet is intended for a recipient on a side of said network bridge on which said at least one data packet was received;
wherein, if it is determined that said at least one data packet is intended for a recipient on a side of said network bridge on which said at least one data packet was received, said at least one data packet is not passed by said network bridge;
wherein, if it is determined that said at least one data packet is not intended for a recipient on a side of said network bridge on which said at least one data packet was received, it is determined if said at least one data packet has a predetermined network layer protocol selected from the group consisting of TCP/IP; IPX; SNA; and Appletalk;
wherein, if it is determined that said at least one data packet has said predetermined network layer protocol, it is determined if said at least one data packet has a predetermined application layer protocol selected from the group consisting of SMTP; FTP; HTTP; SMB; and NFS;
wherein, if it is determined that said at least one data packet has said predetermined application layer protocol, portions of a data file from a plurality of said data packets are concatenated to form a data file to be scanned;
wherein, if it is determined that said at least one data packet does not have said predetermined application layer protocol said at least one data packet is passed by said network bridge without being scanned.

10. A malware scanner as claimed in claim 9, wherein said malware scanner is operable to scan for one or more of:
  computer viruses;
  Trojans;
  worms;
  banned computer programs; and
  banned words within e-mail messages.

11. A malware scanner as claimed in claim 9, wherein said malware scanner is formed of one or more of:
  a software based malware scanner; and
  a hardware based malware scanner.

12. A method of malware scanning comprising the steps of:
  receiving at least one data packet at a network bridge;
  sending at least a portion of said at least one data packet from said network bridge to a malware scanner;
  concatenating data received by said malware scanner to form a data file to be scanned;
  scanning said data file with said malware scanner; and
  forwarding said data file after scanning via said network bridge to an intended recipient;
  wherein said network bridge is address-transparent with respect to data packets passing therethrough, such that at least in terms of addressing, no configuration changes are required when said network bridge is introduced in an associated network segment;
  wherein, upon receipt of at least one of said data packets, said network bridge determines if said at least one data packet is intended for a recipient on a side of said network bridge on which said at least one data packet was received;
  wherein, if it is determined that said at least one data packet is intended for a recipient on a side of said network bridge on which said at least one data packet was received, said at least one data packet is not passed by said network bridge;
  wherein, if it is determined tat said at least one data packet is not intended for a recipient on a side of said network bridge on which said at least one data packet was received, it is determined if said at least one data packet has a predetermined network layer protocol selected from the group consisting of TCP/IP; IPX; SNA; and Appletalk;
  wherein, if it is determined that said at least one data packet has said predetermined network layer protocol, it is determined if said at least one data packet has a predetermined application layer protocol selected from the group consisting of SMTP; FTP; HTTP; SMB; and NFS;
  wherein, if it is determined that said at least one data packet has said predetermined application layer protocol, portions of a data file from a plurality of said data packets are concatenated to form a data file to be scanned;
  wherein, if it is determined that said at least one data packet does not have said predetermined application layer protocol, said at least one data packet is passed by said network bridge without being scanned.

13. A method as claimed in claim 12, wherein said scanning scans for one or more of:
  computer viruses;
  Trojans;
  worms;
  banned computer programs; and
  banned words within e-mail messages.

14. A method as claimed in claim 12, wherein said malware scanner is formed of one or more of:
  a software based malware scanner; and
  a hardware based malware scanner.

* * * * *

UNITED STATES PATENT AND TRADEMARK OFFICE
CERTIFICATE OF CORRECTION

PATENT NO. : 7,023,861 B2
APPLICATION NO. : 09/912305
DATED : April 4, 2006
INVENTOR(S) : Makinson et al.

It is certified that error appears in the above-identified patent and that said Letters Patent is hereby corrected as shown below:

Col. 6, line 41 replace "scanner:" with --scanner;--;
    Col. 8, line 66 replace "protocol" with --protocol,--;
    Col. 10, line 1 replace "tat" with --that--.

Signed and Sealed this

Ninth Day of February, 2010

David J. Kappos
*Director of the United States Patent and Trademark Office*